US012307443B1

(12) United States Patent
Kurennykh et al.

(10) Patent No.: US 12,307,443 B1
(45) Date of Patent: May 20, 2025

(54) WEARABLE DEVICE FOR SECURE SIGNING OF BLOCKCHAIN TRANSACTIONS

(71) Applicant: Tangem AG, Zug (CH)

(72) Inventors: Andrey Kurennykh, Amsterdam (NL); Denis Volokitin, Erevan (AM); Andrew Lazutkin, Lisbon (PT); Mikhail Lyashch, Lisbon (PT)

(73) Assignee: Tangem AG, Zug (CH)

( * ) Notice: Subject to any disclaimer, the term of this patent is extended or adjusted under 35 U.S.C. 154(b) by 0 days.

(21) Appl. No.: 18/633,587

(22) Filed: Apr. 12, 2024

(51) Int. Cl.
*G06Q 20/40* (2012.01)
*G06Q 20/36* (2012.01)
*G06Q 20/38* (2012.01)
*H04L 9/08* (2006.01)
*H04L 9/32* (2006.01)

(52) U.S. Cl.
CPC ... *G06Q 20/3825* (2013.01); *G06Q 20/38215* (2013.01); *G06Q 20/3823* (2013.01); *G06Q 20/3829* (2013.01); *G06Q 20/401* (2013.01); *H04L 9/0819* (2013.01); *H04L 9/3247* (2013.01); *H04L 9/3263* (2013.01)

(58) Field of Classification Search
CPC ........ G06Q 20/3825; G06Q 20/00–425; H04L 9/00–50
USPC ......................................................... 705/64
See application file for complete search history.

(56) References Cited

U.S. PATENT DOCUMENTS

| | | | | |
|---|---|---|---|---|
| 10,707,972 | B1 * | 7/2020 | Zeng | H03H 21/0012 |
| 2015/0040203 | A1 * | 2/2015 | Qian | H04L 63/0861 |
| | | | | 726/7 |
| 2017/0068956 | A1 * | 3/2017 | Jones | G06Q 20/327 |
| 2017/0083909 | A1 * | 3/2017 | Mork | G06Q 20/385 |
| 2017/0126267 | A1 * | 5/2017 | Park | H04B 1/3888 |
| 2019/0311680 | A1 * | 10/2019 | Koo | G06F 3/14 |
| 2019/0354964 | A1 * | 11/2019 | Snow | G06F 16/907 |
| 2023/0143293 | A1 * | 5/2023 | Sanchez | H04L 9/3231 |
| | | | | 713/186 |
| 2024/0029052 | A1 * | 1/2024 | Pinnamaneni | G06Q 20/353 |
| 2024/0070409 | A1 * | 2/2024 | Ershov | H01Q 1/2208 |

FOREIGN PATENT DOCUMENTS

KR         20170049318 A  *  5/2017
WO    WO-2017198891 A1  *  11/2017  ........... A61B 5/6813

* cited by examiner

*Primary Examiner* — Chenyuh Kuo
(74) *Attorney, Agent, or Firm* — ArentFox Schiff LLP; Michael Fainberg

(57) ABSTRACT

Disclosed herein a wearable authentication device of a user for secure signing of blockchain transactions and methods for use thereof. The wearable authentication device includes a tamper-resistant chipset comprising: a transceiver configurable to receive, from a mobile device (e.g., a smartphone), a request for a digital signature for a blockchain transaction, the request including a transaction data; a memory configurable to store one or more cryptographic keys of the user; a secure processor configurable to execute a hardware wallet application that generates the digital signature for the blockchain transaction using a cryptographic key; and the transceiver further configurable to transmit, to the mobile device, the generated digital signature to be used by the mobile device to sign the blockchain transaction.

8 Claims, 4 Drawing Sheets

WEARABLE DEVICE FOR SECURE SIGNING OF BLOCKCHAIN TRANSACTIONS

FIELD OF TECHNOLOGY

The present disclosure relates to the field of data security, and, more specifically, to a wearable authentication device for secure signing of blockchain transactions.

BACKGROUND

Personal cryptographic key management devices (e.g., a hardware wallets, "cold" wallets, self-custody wallets, etc.) are used to store cryptographic keys and digital certificates for authorizing transactions in blockchain systems that require direct user consent (e.g., cryptocurrency transactions, blockchain transactions, distributed ledger transactions, etc.). Typically, hardware wallets are implemented on a USB stick or smart card. However, there is a chance that a user may lose his/her USB stick- or smartcard-based wallet. Therefore, there exists a need for a more secure or secondary hardware wallet that the user can keep on his body.

SUMMARY

Disclosed herein a wearable authentication device for secure signing of blockchain transactions and methods for use thereof. The wearable authentication device may be implemented as a ring, bracelet, pendant, or other types of accessory that can be worn by the user. The wearable authentication device may be equipped with a secure, tamper-resistant chipset executing a hardware wallet application for generating cryptographic keys and signing blockchain transactions. In one example, the wearable device interfaces with a smartphone application of the user via Near Field Communication (NFC) or other wireless communication protocols. The wearable authentication device is also capable of encryption of the data transmitted between the device and the smartphone, to prevent interception or tampering.

In one example, a system for secure signing of blockchain transactions includes a wearable authentication device having a tamper-resistant chipset comprising: a transceiver configurable to receive, from a mobile device (e.g., smartphone), a request for a digital signature for a blockchain transaction, the request including a transaction data; a memory configurable to store one or more cryptographic keys of the user; a secure processor configurable to execute a hardware wallet application that generates the digital signature for the blockchain transaction using a cryptographic key; and the transceiver configurable to transmit, to the mobile device, the generated digital signature to be used by the mobile device to sign the blockchain transaction.

In one example, the wearable authentication device comprises an enclosure for housing the tamper-resistant chipset including one of a ring, pendant, bracelet or keychain.

In one example, the processor further configurable to execute a secure operating system for running the hardware wallet application on the wearable authentication device.

In one example, the system further comprises a blockchain application configurable to be installed on the mobile device of the user and further configurable to: provide a user interface for collecting the blockchain transaction data from the user; wirelessly transmit the blockchain transaction data to the wearable device; wirelessly receive the digital signature from the wearable device; and transmit the transaction data signed with the digital signature to the blockchain network.

In one example, the transceiver of the wearable authentication device is operable to communicate with the mobile user device using a wireless communication protocol, including one of a near-field communication (NFC), Bluetooth, Wi-Fi or ISO/IEC 14443.

In one example, the memory of the wearable authentication device is further configurable to store one or more digital certificates of the user, and the processor is configurable to encrypt data transmitted to the mobile user device using digital certificates of the user.

In one aspect, a method for secure signing of blockchain transactions comprises: providing a wearable authentication device having a tamper-resistant chipset comprising a processor, a memory and a wireless transceiver; configuring the transceiver to receive, from a mobile device of the user, a request for a digital signature for a blockchain transaction, the request including a transaction data; configuring the memory to store one or more cryptographic keys of the user; configuring the processor to execute a hardware wallet application that generates the digital signature for the blockchain transaction using a cryptographic key; and further configuring the transceiver to transmit, to the mobile device, the generated digital signature to be used by the mobile device to sign the blockchain transaction.

Yes in another aspect, a wearable authentication device comprising a tamper-resistant chipset storing thereon executable instructions for secure signing of blockchain transactions, including instructions for: configuring a transceiver to receive, from a mobile device, a request for a digital signature for a blockchain transaction, the request including a transaction data; configuring a memory to store one or more cryptographic keys of a user; configuring a secure processor to execute a hardware wallet application that generates the digital signature for the blockchain transaction using a cryptographic key; further configuring the transceiver to transmit, to the mobile device, the generated digital signature to be used by the mobile device to sign the blockchain transaction.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a wearable device for secure blockchain transaction signing. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
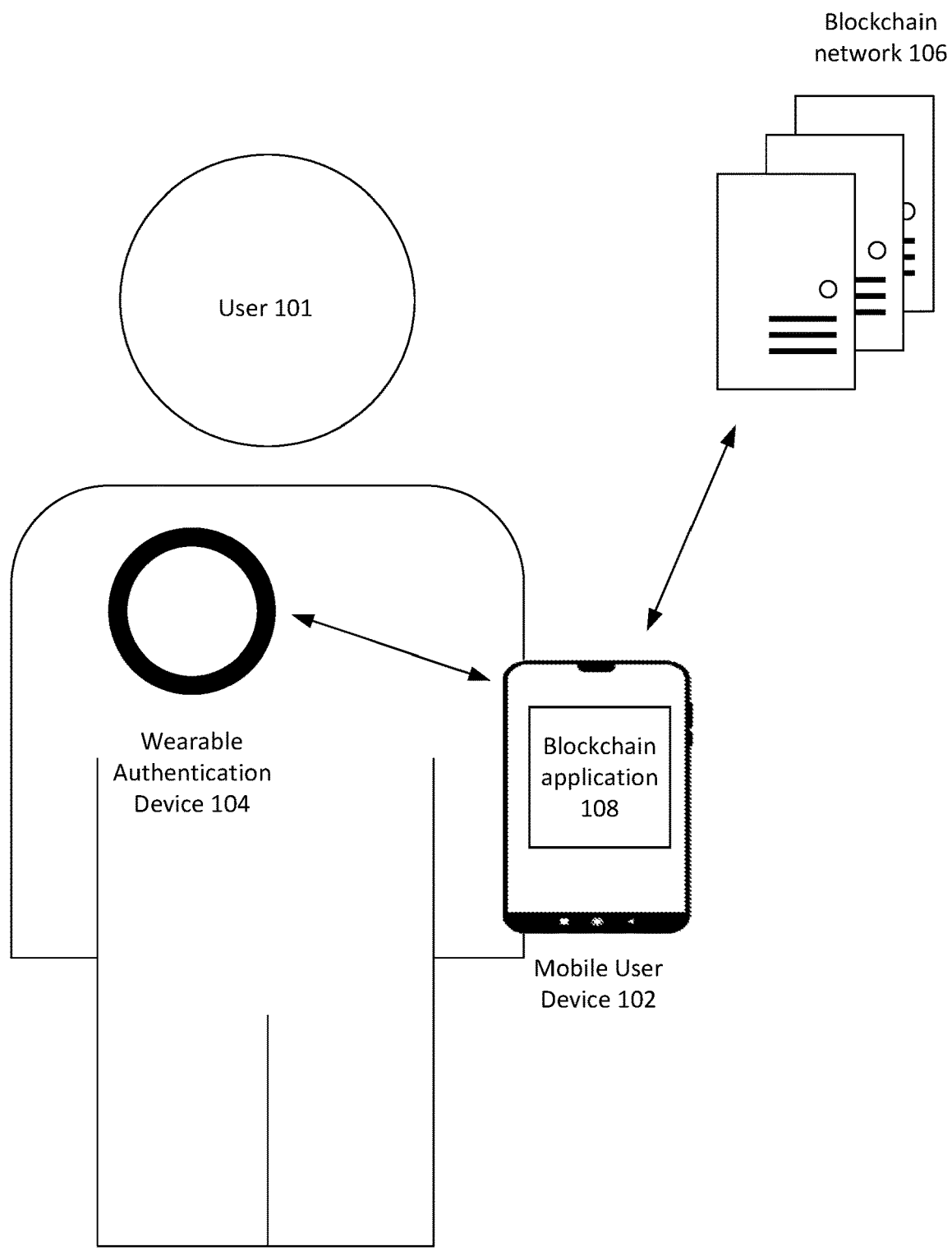
FIG. 1 is a diagram of a system for secure signing of blockchain transactions.

FIG. 1 is a diagram of an exemplary system for secure blockchain transaction signing 100. The system 100 includes a mobile user device 102 (e.g., smartphone, tablet, etc.) that can run a blockchain application 108 for executing cryptocurrency or other blockchain transactions in a distributed ledger 106 (e.g., a central ledger, a blockchain, etc.). In one aspect, user device 102 can wirelessly connect with a wearable authentication device 104 that serves as a personal hardware wallet of the user 101 that is capable to sign blockchain, cryptocurrency and similar transactions. More specifically, wearable authentication device 104 cryptographically secures ownership of digital assets and may comprise a contactless interface (e.g., NFC) that enables interaction with user device 102 to directly authorize transactions in the distributed ledger 106.

In one example aspect, mobile user device 102 may be, for example, an NFC-capable smartphone. User device 102 may provide a user interface (UI) and permit interaction with authentication device 104 via an iOS- or Android-based application and NFC interface. Consider a blockchain-based implementation. In some aspects, user device 102 may perform several functions, including but not limited to obtaining a public key associated with the blockchain wallet of wearable authentication device 104, verifying that authentication device 104 comprises the appropriate private key (such as through a challenge-response mechanism), obtaining a blockchain wallet balance via external blockchain nodes 106, and attesting authentication device 104. Mobile user device 102 may utilize a mobile application, such as an iOS- or Android-based application, that performs the aforementioned functions and the like.

Figure 2:
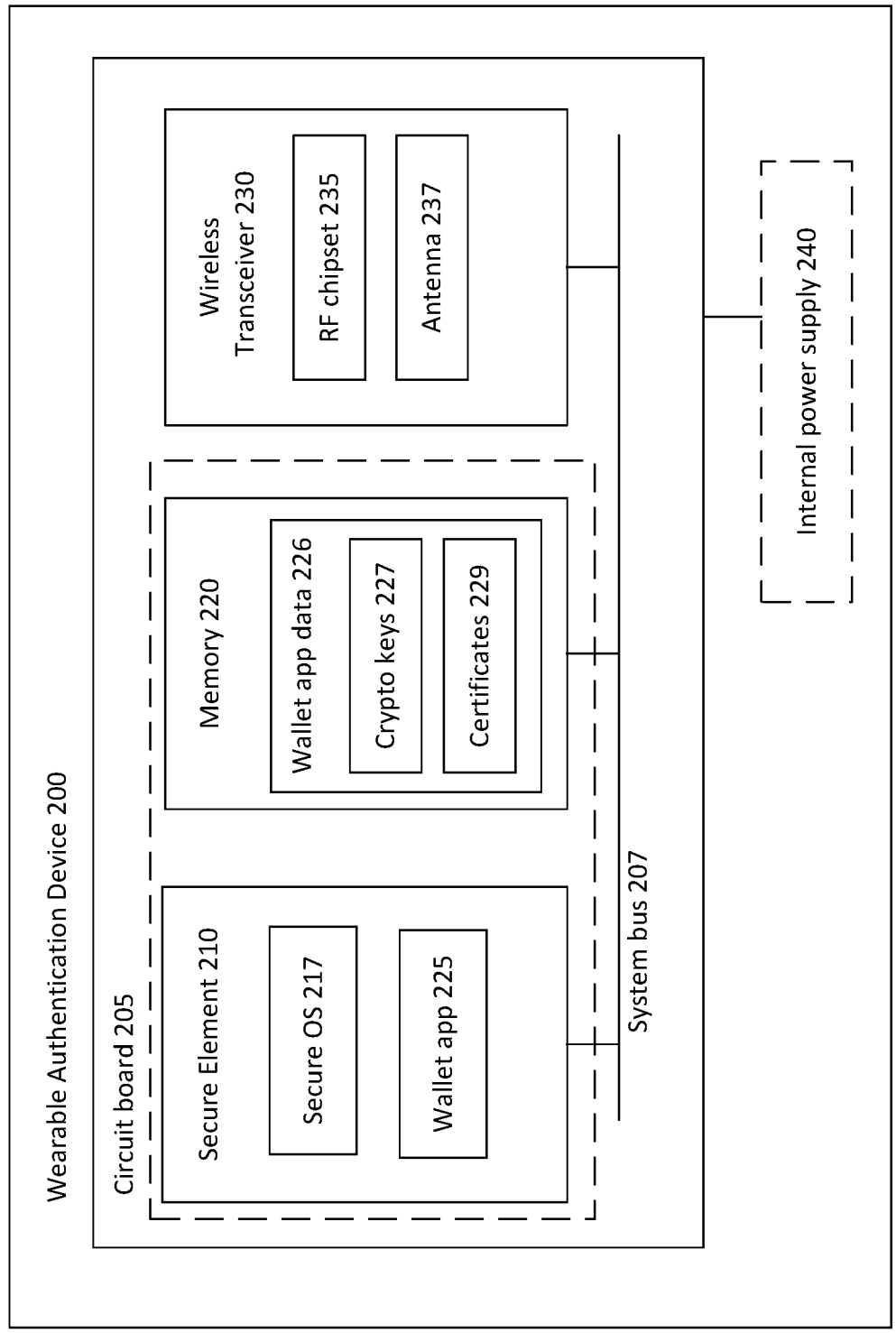
FIG. 2 is a system diagram of a wearable authentication device for secure signing of blockchain transactions.

FIG. 2 is a block diagram of a wearable authentication device 200. In one aspect, device 200 may be implemented as a ring, bracelet, pendant, keychain or other type of wearable accessory, which can be worn by the user 101 on his body. Moreover, wearable authentication device 200 may include both cryptographic and physical measures to protect the integrity of the hardware wallet, cryptographic keys stored therein (e.g., private and public keys), and blockchain signing operations performed using the cryptographic keys. In one aspect, the wearable authentication device 200 includes a circuit board 205 having coupled thereto a secure element 210, a memory 220, a wireless transceiver 230, and an optional internal power supply 240. In various aspect, these electronic components may be implemented as a chipset containing several individual microchips (e.g., integrated circuits), an embedded system, or a system on a chip (SoC).

In one example aspect, the secure element 201 is a tamper-resistant processor chip (e.g., microcontroller) capable of securely hosting a wallet application 225 and its confidential and cryptographic data 226 in accordance with the rules and security requirements set forth by trusted authorities. In one aspect, the secure element 210 may include a secure operating system (OS) 217, which contains security components necessary to protect wallet application 225 and its data 226 against high-level software and hardware attacks. Optionally, secure element 210 may include at least a portion of memory 220 that stores wallet application data 226 (e.g., cryptographic keys 227, digital certificates 229). Alternatively, memory 220 may be implemented on a separate chip, and communicate with the secure element 210 via system bus 207.

In one aspect, the secure element 201 includes a random number generator for generating cryptographic keys 227 (e.g., public/private key pairs) and a secure hash generator both of which are used for signing the blockchain transactions of the user 101. Digital signing in blockchain network is a process for verifying the authenticity of the user 101 who authorizes the blockchain transaction. In order to sign a transaction, user 101 creates a transaction using blockchain application 108 on the mobile device 102. The mobile user device 102 sends transaction data to the wearable authentication device 104 for authentication. The secure element 210 of the wearable user device 104 creates a hash of the received transaction data (e.g., MD5, SHA-1, or SHA-2) using user's own private key 227 (hence generating a digital signature), and returns the signed transaction data (i.e., transaction data and digital signature) back to the blockchain application 108, which forwards it to the blockchain network 106 for processing using the standard communication protocols specific to the blockchain in question. This could involve interacting with blockchain nodes 106 or utilizing an API that facilitates transaction submission. In another aspect, wearable device 104 sends only digital signature back to the blockchain application 108, which appends this digital signature to the transaction data and sends it to the blockchain network 106 for processing. The blockchain network 106 decrypts the digital signature using the user's public key 227 and compares the decrypted data with the transaction data. If data matches, then the authenticity of the user 101 is verified and his blockchain transaction can be performed.

In one example aspect, the memory 220 stores a hardware wallet application data 226, which contains private/public key pairs 227 and digital certificates 229 of the user 101. As indicated above, private/public keys 227 can be used for digital signing of transaction data for purpose of user verification. Digital certificates 229 can be used for the encryption and decryption of wireless transmissions between the wearable authentication device 104 and mobile user device 102 in order to prevent attackers from intercepting and stealing sensitive data. In one example, digital certificates 229 include TLS/SSL certificates. In one aspect, the entire memory 220 or a portion thereof may be a part of the secure element 210. Memory 220 can be implemented as a random access memory (RAM), non-volatile memory, such as read-only memory (ROM), flash memory (e.g., EEPROM) and solid state drives (SSDs).

In one example aspect, the RF transceiver 230 includes a wireless communication chipset 235 for receiving and transmitting radio frequency signals and a RF antenna 237. The communication shipset 235 may be designed to support one or more wireless communication protocols, such as Near Field Communication (NFC), ISO/IEC 14443, Bluetooth, Wi-Fi or the like.

In another aspect, a communication shipset 235 may also support cellular network communication (e.g., 2G, 3G, 4G, 5G, LTE, etc.). In one example, the antenna 237 can be configured to be disposed along the circumference of the ring structure of the device 104 so as to improve the strength of reception of RF signals from the mobile user device 102. The RF transceiver 230 may be connected to the secure element 210 via system bus 207.

In one example aspect, the wearable authentication device 104 may also include an internal power source 240 (e.g., battery) that provides power to the electronic components 210, 220 and 230. Such internal power source may be recharged wirelessly via electromagnetic waves, e.g., radio waves, or directly through a pair electric contacts. In some aspects, wearable authentication device 104 may not have any internal power source, but may activate or function via electromagnetic waves, e.g., radio waves. In other words, electromagnetic waves may both provide a power source and a means of communication for wearable authentication device 104.

Figure 3:
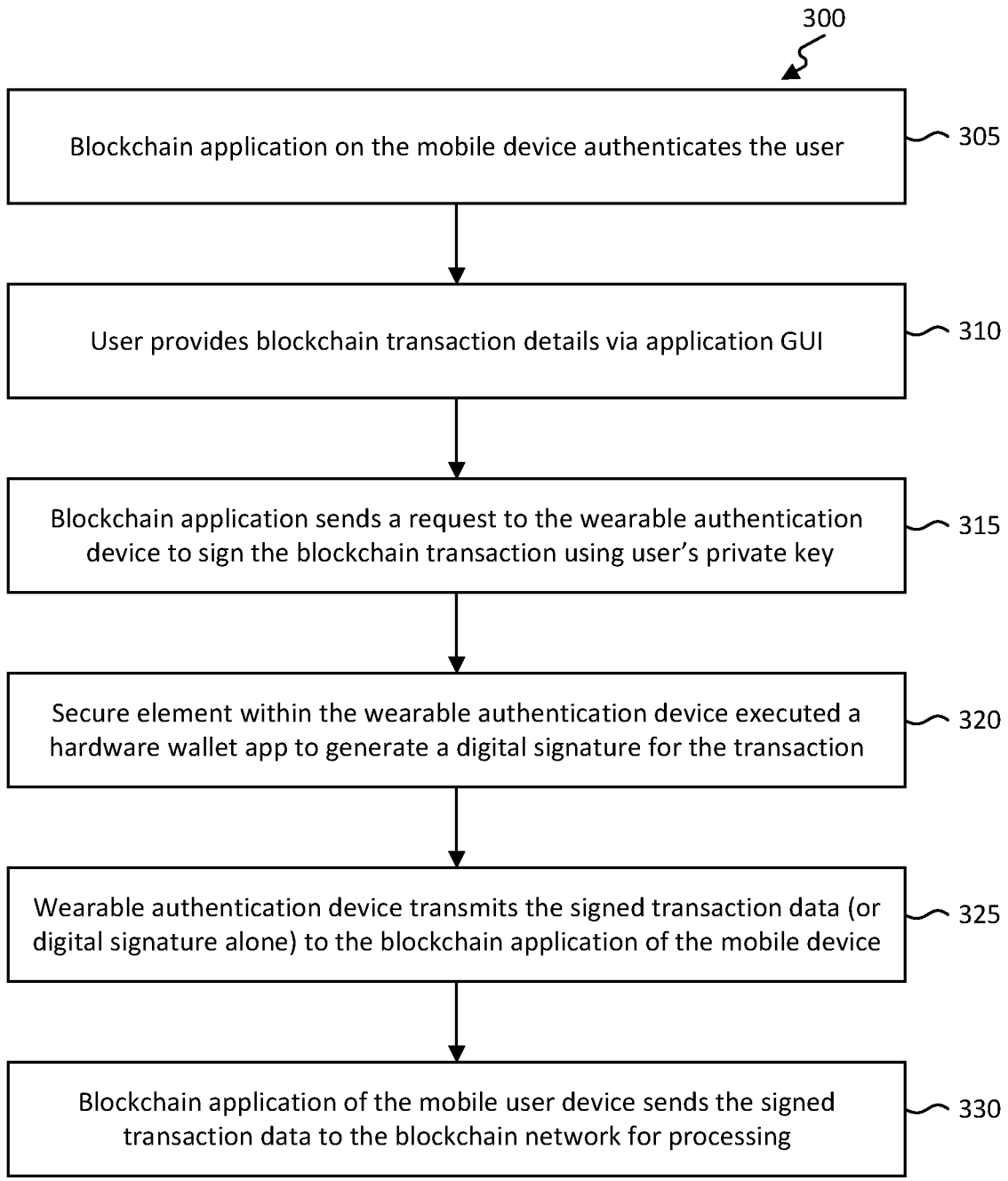
FIG. 3 is a flow diagram of a method for secure signing of blockchain transactions using a wearable authentication device.

FIG. 3 is a flow diagram 300 an example method for secure blockchain transaction signing using a wearable authentication device 104. At step 305, a user 101 authenticates himself with a blockchain application 108 (or application) running on the mobile user device 102 by entering a password. At step 310, the user 101 inputs the transaction details into the application 108. At step 315, the blockchain application 108 sends a request to the wearable authentication device 104 to sign the transaction. This request is transmitted via the NFC interface, which allows for short-range communication between the mobile user device and the wearable device. In one example aspect, wireless data transmissions between the mobile user device 102 and the wearable authentication device 104 may be encrypted using any known encryption technique. For example, digital certificates 229 may be used for data encryption.

At step 320, the secure element 210 within the wearable authentication device 104, which includes a secure processor chip designed to handle cryptographic operations securely, signs the transaction. In one aspect, the secure element 210 executed hardware wallet application 225 that generate a digital signature for the blockchain transaction using privet key 227 of the user 101. The secure element 210 ensures that the private keys 227 used for signing are protected against unauthorized access and are not exposed to the potentially vulnerable environment of the mobile user device 102. In one aspect, the secure element 210 is designed to be tamper-resistant, ensuring that the private keys are not compromised by physical attacks or through the smartphone's potentially vulnerable environment. Also, secure element 210 provides for a secure storages of privet crypto keys in secure memory 220.

At step 325, once the transaction is signed by the secure element 210, the signed transaction data (or generated digital signature alone) is transmitted back to the blockchain application 108 via the NFC interface 230. At step 330, the blockchain application 108 then appends the digital signature to the transaction data and sends it to the blockchain network 106 using the standard communication protocols specific to the blockchain in question. This could involve interacting with blockchain nodes 106 or utilizing an API that facilitates transaction submission. At step 330, a blockchain network node 106 decrypts the digital signature using the user's public key 227 and compares the decrypted data with the received transaction data. If data matches, then the authenticity of the user 101 is verified and transaction is considered legitimate and can be executed by the network 106. At step 335, blockchain network 106 transmits a confirmation of the executed transaction to the blockchain application 108 of the mobile user device 102.

Figure 4:
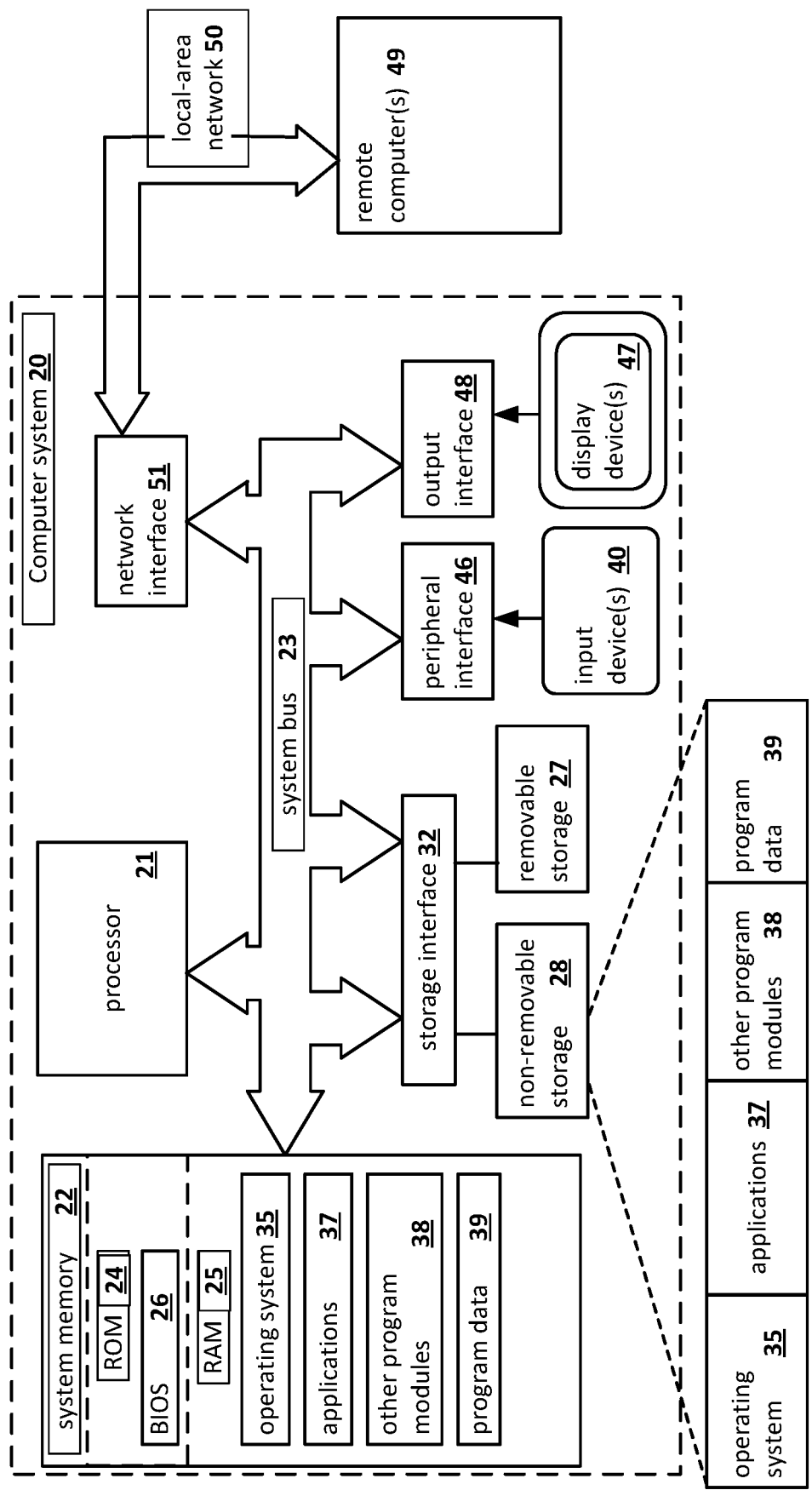
FIG. 4 is a system diagram of a mobile user device for secure processing of blockchain transactions.

FIG. 4 is a system diagram 20 of the mobile user device 102 for secure blockchain transaction processing. The system 20 can be in the form of a single computing device, e.g., a notebook computer, a laptop computer, a mobile computing device, a smart phone, a tablet computer, an embedded device, and other forms of portable computing devices.

As shown, the system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the system 20.

The system 20 may include one or more storage devices such as one or more removable storage devices 27, one or more non-removable storage devices 28, or a combination thereof. In an aspect, the storage devices and the corresponding computer-readable storage media are power-independent modules for the storage of computer instructions, data structures, program modules, and other data of the system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; storage such as in hard disk drives or optical storage.

The system memory 22, removable storage devices 27, and non-removable storage devices 28 of the system 20 may be used to store an operating system 35, additional program applications 37, other program modules 38, and program data 39. The system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the system 20 may be equipped with other peripheral output devices (not shown), such as loudspeakers and other audiovisual devices.

The system 20 may operate in a network environment, using a network connection to one or more remote computers 49. The remote computer (or computers) 49 may be local computer workstations or servers comprising most or all of the aforementioned elements in describing the nature of a system 20. Other devices may also be present in the computer network, such as, but not limited to, routers, network stations, peer devices or other network nodes. The system 20 may include one or more network interfaces 51 or network adapters for communicating with the remote computers 49 via one or more networks such as a local-area computer network (LAN) 50, a wide-area computer network (WAN), an intranet, and the Internet.

Embodiments of the present invention may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk or a memory stick. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the mobile user device 102 through any type of network, including a LAN or WAN). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for secure signing of blockchain transactions for a user, comprising:
   a blockchain application installed a mobile device of the user;
   a wearable hardware wallet ring of the user, wherein the wearable hardware wallet ring comprises an enclosure for housing a tamper-resistant chipset, wherein the tamper-resistant chipset comprises:
      a secure processor comprising a secure operating system and a wallet software application;
      a memory storing cryptographic data including one or more cryptographic keys of the user;
      a wireless transceiver comprising an RF antenna disposed along a circumference of the hardware wallet ring, wherein the wireless transceiver communicates, via electromagnetic waves, with the mobile device using a near-field communication (NFC) wireless communication protocol;
      an internal power source, wherein the internal power source is wirelessly recharged via the electromagnetic waves, wherein the internal power source is configured to power the memory and the secure processor; and
   wherein the wearable hardware wallet ring is configured to:
      receive, via the RF antenna and from the mobile device of the user, a request to provide a digital signature for a blockchain transaction, wherein the request comprises a blockchain transaction data, wherein receiving the request comprises receiving the request as the electromagnetic waves via the RF antenna;

execute the secure operating system for executing the wallet software application in response to receiving the request, wherein executing the wallet software application comprises:
 generating a digital signature for the blockchain transaction using a cryptographic key of the one or more cryptographic keys; and
 transmit, via the wireless transceiver, the generated digital signature to the mobile device; and
wherein the mobile device of the user, via the blockchain application, is configured to:
 attest the hardware wallet ring;
 collect the blockchain transaction data from the user via a user interface;
 obtain a public cryptographic key of the user;
 transmit the request for the digital signature for the blockchain transaction to the hardware wallet ring;
 receive the digital signature from the hardware wallet ring;
 verify the received digital signature using the obtained public cryptographic key of the user; and
 transmit the blockchain transaction data signed with the digital signature to the blockchain network.

2. The system of claim 1, wherein the mobile device transmits, to the wearable hardware wallet ring, the request for the digital signature using the near-field communication (NFC) wireless protocol.

3. The system of claim 1, wherein the blockchain transaction corresponds to a cryptocurrency transaction.

4. The system of claim 1, wherein the cryptographic data stored in the memory further comprises one or more digital certificates of the user, wherein the mobile device is further configured to encrypt the request for digital signature using a digital certificate of the user.

5. A method using a wearable hardware wallet ring and a mobile device of a user for secure signing of blockchain transactions for the user, wherein the mobile device comprises a blockchain application, the method comprising:
 wherein the wearable hardware wallet ring comprises an enclosure for housing a tamper-resistant chipset comprising a secure processor, a memory, an internal power source, and a wireless transceiver comprising an RF antenna disposed along a circumference of the hardware wallet ring, wherein the secure processor comprises a secure operating system and a wallet software application, wherein the memory stores cryptographic data including one or more cryptographic keys of the user, wherein the wireless transceiver communicates, via electromagnetic waves, with the mobile device using a near-field communication (NFC) wireless communication protocol, wherein the internal power source is wirelessly charged via the electromagnetic waves via communication with the mobile device and power the secure processor and the memory;
 receiving, by the wearable hardware wallet ring via the RF antenna of the wireless transceiver, from a mobile device of the user, a request to provide a digital signature for a blockchain transaction, wherein the request comprises a blockchain transaction data, wherein receiving the request further comprises receiving the request as electromagnetic waves via the RF antenna;
 executing, by the wearable hardware wallet ring via the processor, the secure operating system for executing the wallet software application, wherein executing the wallet software application comprises:
  generating a digital signature for the blockchain transaction signing using a cryptographic key of the one or more cryptographic keys;
  transmitting, by the wearable hardware wallet ring via the wireless transceiver, to the mobile device, the generated digital signature;
 attesting, by the mobile device via the blockchain application, the hardware wallet ring;
 collecting, by the mobile device via the blockchain application, the blockchain transaction data from the user via a user interface;
 obtaining, by the mobile device via the blockchain application, a public cryptographic key of the user;
 transmitting, by the mobile device via the blockchain application, the request for the digital signature for the blockchain transaction data to the hardware wallet ring;
 receiving, by the mobile device via the blockchain application, digital signature from the hardware wallet ring;
 verifying, by the mobile device via the blockchain application, the received digital signature using the obtained public cryptographic key of the user; and
 transmitting, by the mobile device via the blockchain application, the blockchain transaction data signed with the digital signature to the blockchain network.

6. The method of claim 5, wherein the mobile device transmits, to the wearable hardware wallet ring, the request for the digital signature using the near-field communication (NFC) wireless communication protocol.

7. The method of claim 5, wherein the blockchain transaction corresponds to a cryptocurrency transaction.

8. The method of claim 5, wherein the cryptographic data stored in the memory further comprises one or more digital certificates of the user, wherein the method further comprises:
 encrypting, by the mobile device, the request for digital signature is encrypted using a digital certificate of the user.

* * * * *